United States Patent
Yuan et al.

(10) Patent No.: US 12,019,999 B2
(45) Date of Patent: Jun. 25, 2024

(54) PROVIDING A WELL-FORMED ALTERNATE PHRASE AS A SUGGESTION IN LIEU OF A NOT WELL-FORMED PHRASE

(71) Applicant: GOOGLE LLC, Mountain View, CA (US)

(72) Inventors: Wangqing Yuan, Wilmington, MA (US); David Kogan, Natick, MA (US); Vincent Lacey, Mountain View, CA (US); Guanglei Wang, Cambridge, MA (US); Shaun Post, San Mateo, CA (US); Bryan Christopher Horling, Belmont, MA (US); Michael Anthony Schuler, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 370 days.

(21) Appl. No.: 17/351,872

(22) Filed: Jun. 18, 2021

(65) Prior Publication Data
US 2022/0405488 A1  Dec. 22, 2022

(51) Int. Cl.
*G06F 40/51* (2020.01)
*G06F 40/211* (2020.01)
*G06F 40/289* (2020.01)

(52) U.S. Cl.
CPC ............ *G06F 40/51* (2020.01); *G06F 40/211* (2020.01); *G06F 40/289* (2020.01)

(58) Field of Classification Search
CPC ..................................................... G09B 19/06
See application file for complete search history.

(56) References Cited

U.S. PATENT DOCUMENTS

| | | | | |
|---|---|---|---|---|
| 9,830,391 | B1 * | 11/2017 | Bakir | G06F 16/3322 |
| 10,594,757 | B1 * | 3/2020 | Shevchenko | G06F 17/18 |
| 11,657,307 | B1 * | 5/2023 | Bodapati | G06N 20/00 |
| | | | | 706/15 |
| 2007/0073532 | A1 * | 3/2007 | Brockett | G06F 40/58 |
| | | | | 704/9 |

(Continued)

OTHER PUBLICATIONS

Won Kim, Lana Yeganova, Donald C. Comeau, W. John Wilbur "Identifying well-formed biomedical phrases in Medline text" Journal of Biomedical Informatics 45 (2012) 1035-1041, https://doi.org/10.1016/j.jbi.2012.05.005 (Year: 2012).*

(Continued)

*Primary Examiner* — Richemond Dorvil
*Assistant Examiner* — Alexander G Marlow
(74) *Attorney, Agent, or Firm* — Gray Ice Higdon

(57) ABSTRACT

Implementations relate to determining a well-formed phrase to suggest to a user to submit in lieu of a not well-formed phrase. The suggestion is rendered via an interface that is provided to a client device of the user. Those implementations relate to determining that a phrase is not well-formed, identifying alternate phrases that are related to the not well-formed phrase, and scoring the alternate phrases to select one or more of the alternate phrases to render via the interface. Some of those implementations are related to identifying that the phrase is not well-formed based on occurrences of the phrase in documents that are generated by a source with the language of the phrase as the primary language of the creator.

14 Claims, 6 Drawing Sheets

(56) References Cited

U.S. PATENT DOCUMENTS

2016/0027333 A1\* 1/2016 Labutov .................. G06F 40/44
                                                           434/157
2018/0232357 A1\* 8/2018 Beller .................... G06F 40/284
2020/0097560 A1\* 3/2020 Kulkarni ................ G06F 16/248
2020/0167379 A1\* 5/2020 Faruqui .................. G06N 3/084
2022/0046132 A1\* 2/2022 Matula ................... G06F 40/30

OTHER PUBLICATIONS

Víctor M. Sánchez-Cartagena, Marta Bañón, Sergio Ortiz-Rojas, and Gema Ramírez. 2018. Prompsit's submission to WMT 2018 Parallel Corpus Filtering shared task. In Proceedings of the Third Conference on Machine Translation: Shared Task Papers, pp. 955-962, Belgium, Brussels. (Year: 2018).\*

\* cited by examiner

PROVIDING A WELL-FORMED ALTERNATE PHRASE AS A SUGGESTION IN LIEU OF A NOT WELL-FORMED PHRASE

BACKGROUND

A user may submit a phrase or query in a language other than the primary language of the user. For example, a user may submit a query to an automated assistant in a secondary language of the user and/or a language that the user is currently learning. The user may expect a response that is similar or the same as a response that would be provided in the primary language of the user. In some instances, the response may include the automated assistant performing one or more tasks and/or issuing a response to the query in the same language as the query and/or in the primary language of the user.

In some instances, the user may not provide a query with proper grammar and/or with incorrect usage of one or more terms. This is particularly of importance when the user submits a query in a language other than the primary language of the user. For example, the user, in submitting a query in a foreign language, may not be aware of grammatical errors and/or vocabulary issues that may cause the automated assistant to perform tasks other than the intended task and/or the automated assistant may not be able to understand the intent of a vague and/or grammatically incorrect query. Thus, in addition to a user lacking knowledge to submit queries in a language that the user is learning, computing resources can be wasted with attempts to process a query of a user that is not well-formed.

SUMMARY

Implementations disclosed herein relate determining that a phrase in a particular language is not well-formed, processing the phrase to identify a plurality of alternate phrases that are well-formed and that have a defined relationship to the phrase (e.g., the phrase and the alternate phrases can each cause performance of the same automated assistant action(s)), generating a corresponding score for each of the alternate phrases, and selecting one of the alternate phrases based on the scores. Implementations further relate to subsequently, when audio data is processed that includes a user uttering the phrase (that is not well-formed) as all or part of a command to an automated assistant to perform action(s), the selected alternate phrase can be rendered to the user as a suggestion for utilization in lieu of the phrase.

In some versions of those implementations, rendering the alternate phrase is in response to determining that the particular language, of the phrase, is not specified as the primary language for the user (in addition to being in response to determining that the audio data includes the phrase, and in response to selecting the particular alternate phrase). Put another way, in those versions, the alternate phrase will be rendered when it is determined that the particular language is not specified as the primary language for the user, but will not be rendered when the particular language is specified as the primary language for the user. In those versions, the alternate phrase can be rendered even in situations where the phrase is correctly interpreted by the automated assistant, resulting in successful execution of the corresponding action(s). Still rendering the alternate well-formed phrase can assist the user in learning and/or utilizing the particular language, particularly when the user is determined to have a low proficiency in the particular language. This increases the likelihood that future phrases (that can differ from, but have commonalities with the well-formed alternate phrase), provided by the user as future commands to the automated assistant, are better formed and more likely to be correctly interpreted by the assistant. This prevents the automated assistant from failing for a future command and prevents the extra processing required to render an error message for the failure and/or to process another utterance of the user, that is a repeated attempt at causing performance of the future command. Moreover, in implementations that only render the alternate phrase in response to determining that the particular language, of the phrase, is not specified as the primary language for the user, the computational resources required to render the alternate phrase (and the prolonging of the user-assistant interaction) are balanced with the aforementioned efficiencies of the user being provided with the well-formed alternate phrase. Put another way, the downstream efficiencies of rendering of the well-formed alternate phrase can be the most pronounced for users for which the particular language is not their primary language.

In some implementations, one or more indications may be utilized to determine, for a given phrase, whether the phrase is well-formed. For example, for a given phrase in a particular language, identified historical usage of the phrase by speakers that have the particular language indicated as a primary language may be utilized to determine the quantity of occurrences of the phrase in interactions records of users. A user with the particular language as a primary language may be less likely to make grammatical and/or other errors in submitting textual queries, uttering spoken queries in the particular language, and/or otherwise interacting with one or more applications with phrases in the particular language. Thus, whether a phrase occurs in the historical interaction records of user(s) having the particular language as the primary language, a quantity of times that the phrase occurs, and/or it's frequency of occurrence can indicate that the phrase is (or in the case of absence of the phrase in historical interaction records, is not) well-formed. In some implementations, a phrase that occurs infrequently in user historical interaction records may be determined to not be well-formed and/or may be provided with a scoring measure that is less indicative of being well-formed than a second phrase that occurs with greater frequency in historical interaction records of a speaker of the particular language.

In some implementations, one or more documents, such as webpages, that are in the particular language, can additionally or alternatively be analyzed in determining whether the phrase appears in the document(s). For example, for a particular language of Spanish, one or more Spanish language websites, such as news outlets in Spanish, can be analyzed to determine a quantity of occurrences of the phrase. Because the sources are in the particular language and, in some cases, have been determined to be accurate sources for language syntax (e.g., known to be grammatically correct), absence of the phrase in the documents can indicate that the phrase is not commonly utilized by speakers of the particular language and thus may not be well-formed.

In some implementations, a perplexity score for the phrase can additionally or alternatively be utilized in determining whether the phrase is well-formed. For example, a language model, for a language of the phrase, can be utilized to predict a measure that reflects likelihood that terms of the phrase would co-occur in a phrase and/or occur in the particular sequence in which they are ordered in the phrase. In instances where the language model is utilized to determine that the first term does not likely follow the second term (i.e., high perplexity) in well-formed phrases, the phrase may be determined to be not well-formed. Conversely, in instances where two or more terms, when taken together in a phrase, have a low perplexity, the phrase may be determined to be well-formed because the phrase likely follows the grammatical rules of the particular language.

In some implementations, a phrase may be analyzed using a machine learning model and/or a rules-based approach to identify grammatical errors and/or incorrect usage of one or more terms in the phrase. For example, for a phrase of "time it is," one or more language models and/or rules may be used to determine that the phrase is not likely a well-formed phrase based on one or more terms being missing and/or in the incorrect order. Thus, a phrase of "time it is" may be not well-formed and the phrase "what time is it," which follows the grammatical rules of English, may be more likely to be determined to be a well-formed phrase.

In some implementations, a proficiency level of the source of a phrase may be utilized to determine the likelihood that a phrase is well-formed. For example, as previously mentioned, one or more documents may be analyzed to identify the occurrence of a phrase. For each of the documents, a score for the level of the proficiency of the author may be utilized in determining whether a phrase is well-formed. As an example, a Spanish language newspaper with a high viewership (i.e., a trusted source) may be more likely to include well-formed phrases than a webpage that is published by an unknown individual. Thus, occurrence of the phrase in one or more webpages of the Spanish language newspaper can be an indication that the phrase is well-formed. Conversely, absence (or low occurrence) of a phrase in one or more documents from a known speaker of the particular language can be indicative of the phrase not being well-formed.

Once a phrase is determined to be not well-formed, one or more alternate phrases can be identified as candidate phrases to suggest as a replacement for the phrase. In some implementations, an intent can be determined for the phrase and one or more phrases with the same intent can be identified as alternate phrases. For example, for a phrase of "weather is what," an intent of "CURRENT WEATHER" can be determined. Other phrases that are well-formed with the same intent can be identified, such as "What is the weather" and/or "what is the current weather." In some implementations, one or more other similar phrases, such as well-formed phrases that include one or more of the same terms as the phrase, can be identified. For example, for the phrase "weather what," the phrase "what is the weather" may be identified based on both phrases including the terms "weather" and "what."

In some implementations, the phrase may be processed to generate an encoding of the phrase in vector space. One or more of the alternate phrases may further be encoded into the same vector space and alternate phrases can be selected based on proximity of the encodings of the alternate phrases to the encoding of the phrase. For example, in some additional or alternative implementations, machine learning model(s) can be utilized to generate a text embedding (e.g., a lower-dimensional representation, such as a word2vec representation) corresponding to text of the queries, commands, and/or requests. These embeddings can be points mapped to an embedding space where words or phrases that are semantically similar are mapped to the same or similar portions of the embedding space. Further, these portions of the embedding space can be associated with one or more of the plurality of disparate semantic categories, and a given one of the embeddings can be classified into a given one of the semantic categories if a distance metric between the given one of the embeddings and one or more of the portions of the embedding space satisfy(ies) a distance threshold. For instance, cooking-related words or phrases can be mapped to a first portion of the embedding space that is associated with a "cooking" semantic label, weather-related words or phrases can be mapped to a second portion of the embedding space that is associated with a "weather" semantic label, and so on.

In some implementations, each of the identified alternate phrases can be scored to determine an alternate phrase of the plurality of identified alternate phrases that may be provided as a replacement for the not well-formed phrase. A score, for each of the alternate phrases, can be utilized to determine which of the alternate phrases to provide as a suggestion to utilize in lieu of the not well-formed phrase. For example, for a phrase of "time is it," alternate well-formed phrases of "what time is it" and "it is time" can both be determined to be alternate phrases based on one or more criteria described above. Each of the alternate phrases can be scored according to one or more of the methods described herein, and one (or more) of the phrases can be selected as the well-formed alternate phrase to provide as a suggestion to utilize in lieu of "time is it."

In some implementations, a candidate alternate phrase can be scored based on its occurrence in usage records and/or documents of one or more sources. For example, an alternate phrase may occur in one or more documents, such as webpages from known speakers of the particular language, and the score for the alternate phrase can be determined based on the number of times the phrase is included in the webpages and/or a frequency of the appearance of the alternate phrase over a plurality of webpages. In some implementations, the proficiency of the source in the particular language may first be determined such that only documents and/or other sources that are from authors with a threshold proficiency measure are utilized in identifying and scoring an alternate phrase. For example, an alternate phrase may appear in five documents, with three of the documents from authors with a threshold proficiency in the particular language. The score for the alternate phrase can be determined based on, for example, the occurrence of the alternate phrase in the documents that are from authors with the threshold proficiency and not based on the occurrence of the alternate phrase in the other documents that are from authors with lower proficiency in the particular language.

In some implementations, a given alternate phrase can be scored based on a comparison of the terms of the alternate phrase with the terms of the not well-formed phrase. For example, for a given phrase of "time it is," one or more alternate phrases can be compared to the not well-formed phrase to determine a similarity in terms between the two phrases. For a candidate alternate phrase of "what time is it," a score can be generated based on the number of terms that are the same in the two phrases. In this instance, all of the terms of the not well-formed phrase are present in the candidate alternate phrase. Also, for example, for a not well-formed phrase of "weather tomorrow is," a candidate alternate phrase of "what is the weather tomorrow" may be assigned a score that is more indicative of a replacement for the not well-formed phrase than "what is the weather" based on identifying that the second candidate phrase does not include the term "tomorrow," which is included in the not well-formed phrase.

In some implementations, an alternate phrase of the alternate phrases is selected based on the scores of the alternate phrases. For example, each of the phrases may be scored with a score that is indicative of likelihood that, for a given alternate phrase, the alternate phrase is an acceptable well-formed version of the submitted phrase that, when submitted, causes the same response as the not well-formed phrase. For example, a score of 0.9 may be determined for a phrase that is identified multiple times in sources and has a threshold similarity to the initial phrase. Also, for example, a score of 0.5 may be determined for a second alternate phrase that has fewer occurrences in sources and/or has less determined similarity to the initial phrase.

The selected alternate phrase for the not well-formed phrase can be stored in a database for later retrieval. For example, a database may include pairs of not well-formed phrases and acceptable replacements for the not well-formed phrases. Subsequently, when a phrase is received, one or more alternate phrases can be identified and provided in response to the not well-formed phrase. In some implementations, each of the not well-formed phrases may be paired with a single alternate phrase. In some implementations, a not well-formed phrase may be associated with multiple alternate phrases, each of which may have a different intent that matches the intent of the not well-formed phrase. For example, for the not well-formed phrase "time it is," both "what time is it" and "it is time" are both well-formed and have similarities to the not well-formed phrase, but with different intent. Thus, when the phrase "time it is" is received, either (or both) of the alternate phrases may be provided, depending on the context and determined intent of the phrase "time it is." The user may then select one of the provided alternate phrases based on the intent of the selected alternate phrase matching the intent of the not well-formed phrase.

In some implementations, a user may provide audio and/or text that includes the not well-formed phrase. In some implementations, the user may be provided with the alternate phrase that corresponds to the not well-formed phrase. For example, the user may utter the phrase "time it is" and/or provide textual input of "time it is." In response, the phrase "time it is" may be identified in the database that includes the well-formed phrases mapped to not well-formed phrases. The corresponding phrase can then be provided to the user as a suggestion to be utilized in lieu of the initially provided phrase.

In some implementations, the user may be provided with alternate phrases to a not well-formed phrase only when the phrase is in a language other than the primary language of the user. For example, an account of the user may indicate a language of preference, or a primary language for the user, and identified phrases that are not in the primary language of the user may be analyzed to determine whether the phrases are well-formed. Thus, checking for alternate phrases may be performed only in instances where the user is speaking a language other than the primary language for the user. For example, if the user has Spanish set as a primary language, any submitted phrases that are identified as being in Spanish may not be analyzed to determine whether the phrases are well-formed, but phrases that are identified as being in English may be further analyzed to determine whether the phrase(s) are well-formed.

In some implementations, determining that the particular language is not the primary language of the user may be based on one or more settings that are selected by the user in connection with an account of the user. For example, a user account may have a parameter to indicate the primary language of the user and/or a preferred language for the user. In instances where a phrase is received that is not well-formed and is not in the primary language of the user, one or more alternate phrases may be provided in response.

In some implementations, determining that the particular language is not the primary language of the user may be based on a particular language proficiency measure for the user. For example, instead of identifying a particular language that is the primary language of the user, a language proficiency measure may be determined for the user. A user may have multiple proficiency measures, each for a different particular language. Thus, when a user submits a phrase in a language, the language proficiency measures for the user may be utilized to determine the familiarity of the user with the language in which the phrase is in and further determine whether to provide a suggestion to a phrase that is not well-formed.

In some implementations, the particular language proficiency measure for the user may be determined based on past interactions of the user. The interactions can be between the user and one or more applications. In some instances, the language proficiency measure can be determined based on the past interactions with particular applications. For example, interactions of the user with select applications may be utilized to determine a language proficiency measure, while interactions of the user with other applications may not be utilized to determine the language proficiency measure. As an example, in some implementations disclosed herein, past interactions of the user with one or more applications other than a language learning application can be utilized to determine a language proficiency measure.

In some implementations, one or more queries that are provided by the user via a spoken utterance may be utilized to determine a language proficiency measure for the user. For example, the choice of vocabulary of the user, when submitting spoken queries in the language, may be indicative of the proficiency of the user. Accordingly, a language proficiency measure can be determined that reflects the limited vocabulary of the user. Also, for example, grammatical and/or pronunciation errors of the user, when submitting spoken queries in the language, may be indicative of the language proficiency of the user. Accordingly, a language proficiency measure may be determined for a user that submit queries with grammatical and/or pronunciation errors that is less indicative of proficiency than a user that submit spoken queries that are grammatically correct.

In some implementations, interactions of the user that include the user submitting text in the particular language may be utilized to determine a language proficiency measure for the user. For example, with permissions from the user, emails of the user that include terms and/or phrases in the language may be identified and, based on the correctness of the grammar and/or the selection of terms in the emails (or other documents) can be utilized to determine a language proficiency measure for the user. Also, for example, auto-suggestions that are provided to the user when submitting queries can be utilized to determine a language proficiency measure (e.g., common terms that are autocorrected can result in a determined language proficiency measure that is less indicative of proficiency than a user that does not require autocorrect for the same common terms and/or phrases).

In some implementations, a language proficiency measure can be determined for a user based on the user submitting queries (e.g., spoken queries and/or text queries) that are related to the language but provided in the primary language of the user. For example, a user may submit a request to translate a phrase from the primary language of the user to the particular language. The language proficiency measure can be determined based on complexity of the phrases such that, for example, a user that submits requests for common terms may have a lower determined proficiency measure than a user that submits requests to translate more complex phrases.

In some implementations, user requests for additional information related to the particular language can be utilized to determine a language proficiency measure for the user. In some implementations, web activity of the user may be utilized to determine a particular language proficiency measure for the user. For example, in addition to submitting requests to translate terms into the particular language and/or submitting queries in the language, the user may submit a request to be provided with additional resources related to learning the language, such as "what is the best way to learn Spanish" or "take me to a website for learning French." Also, for example, the user may navigate to a webpage that is related to learning the particular language. Also, for example, the user may navigate to webpages that include content that is in the particular language. In some implementations, interactions of the user with one or more language learning applications can be utilized to determine a language proficiency measure for the user. For example, a user may download an application that is utilized to learn the particular language, interact with one or more applications that are related to learning the language, and/or otherwise utilize an application that, through the interactions of the user, may be used to determine a language proficiency measure for the user indicative of proficiency in the particular language.

In some implementations, one or more steps described herein may be performed before the user submits the phrase. For example, a database of not well-formed phrases and alternate phrase(s) for each not well-formed phrase can be generated as described herein. In instances where a user submits a phrase that is included in the database, the alternate phrase(s) can be provided in response.

In some implementations, one or more of the steps described herein may be performed in response to the user submitting the phrase. For example, a phrase may be received, determined to be not well-formed, and alternate phrases may be identified and scored as described herein. One of the alternate phrases may then be provided to the user as a suggestion to utilize in lieu of the not well-formed phrase. Additionally or alternatively, once the alternate phrase has been identified, the not well-formed phrase and its alternate phrase(s) may be stored in a database to be utilized with subsequent submissions of the not well-formed phrase.

Implementations described allow for a user to be provided with an alternate phrase for a phrase that is not well-formed to allow the user to submit the alternate phrase, which is well-formed, in lieu of the not well-formed phrase. By providing the user with a well-formed alternative, the user can submit the alternate phrase and be provided with a response that is of interest without requiring the user to submit a query multiple times in the particular language. For example, a user may submit a query of "time is it" to inquire about the current time, but instead the user may be provided with a response that is unrelated to the current time. The user would then be required to either resubmit the query and/or utilize additional computing resources to determine a better alternative phrase. Preemptively suggesting an alternate phrase to a not well-formed phrase mitigates the need for the user to repeatedly submit queries in the particular language and/or to spend additional resources to determine what is a more well-formed version of the intended query.

DETAILED DESCRIPTION

Figure 1:
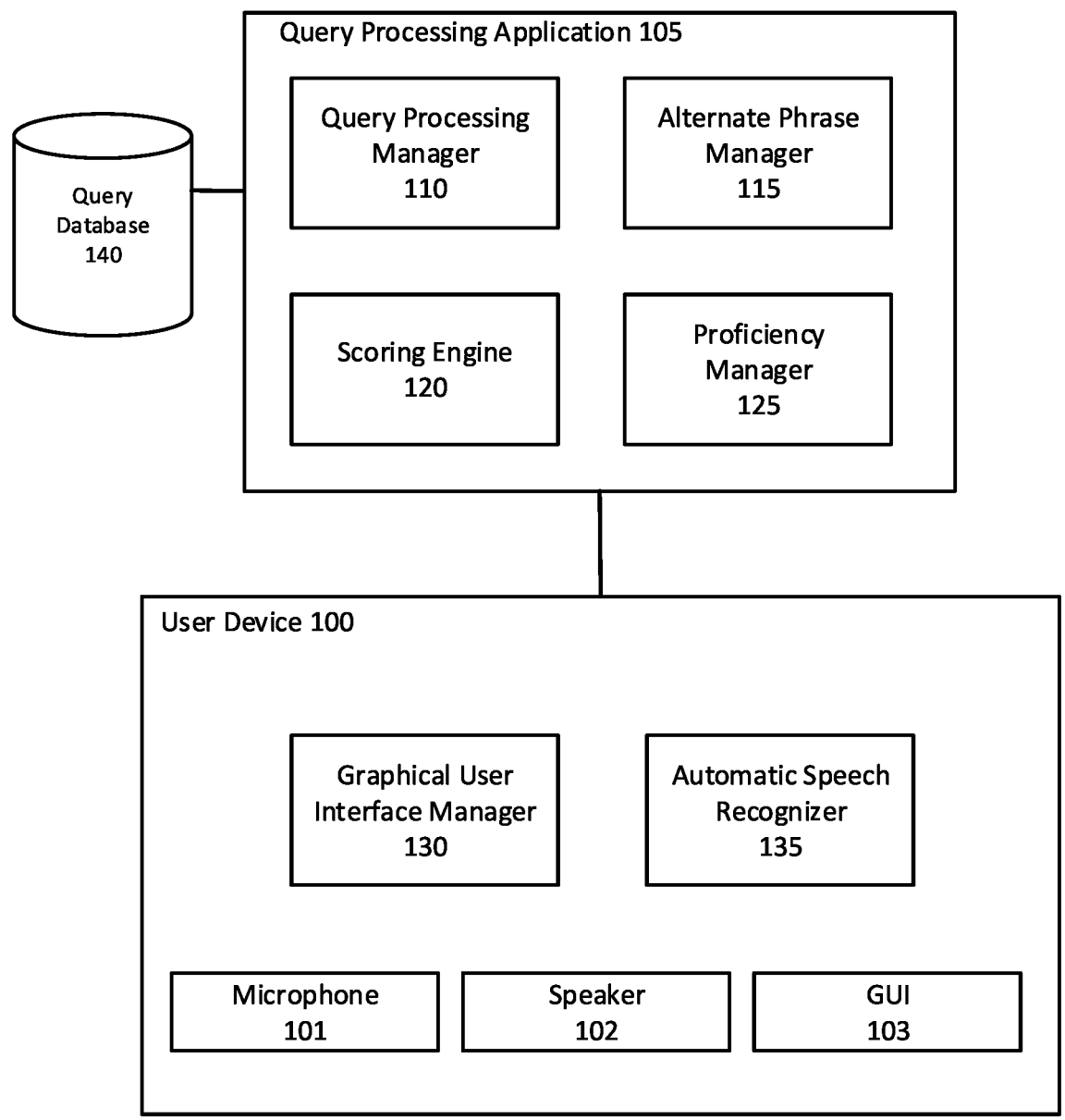
FIG. 1 is an illustration of an example environment in which implementations disclosed herein may be implemented.

Referring to FIG. 1, an example environment is illustrated in which implementations described herein can be implemented. The environment includes a user device 100 and a query processing application 105. As illustrated, the query processing application 105 is executing on a computing device other than the user device 100. For example, the query processing application 105 can be executing on a server with which the user device 100 is in communication. However, in some implementations, query processing application 105 and/or one of its components may be executing on the user device 100.

The environment further includes a query database 140. The query database 140 can include a plurality of queries that are not well-formed (e.g., have grammatical errors) that are each mapped to one or more alternate queries that are well-formed. For example, query database 140 may include a record for the not well-formed phrase "time it is," which may be mapped to the well-formed phrases "it is time" and/or "what time is it." In some implementations, one or more of the not well-formed phrases and its corresponding well-formed alternative(s) may be stored in query database 140 by one or more components of FIG. 1, such as query processing manager 110.

Query processing manager 110 receives queries from one or more sources and provides the queries to alternate phrase manager 115. In some implementations, query processing manager 110 can receive a query from a user via a user device, such as user device 100. For example, a user may submit a phrase of "time it is" to an automated assistant executing on user device 100, which provides the phrase to query processing manager 110. In some implementations, query processing manager 110 may identify one or more phrases that are stored in a database, such as query database 140, that are identified as not well-formed and/or that do not have an alternate well-formed phrase associated with it. For example, query database 140 can include a plurality of phrases that have been previously submitted by users, each of which may not have been analyzed to determine whether they are well-formed and/or have been associated with one or more alternate phrases.

In some implementations, query processing manager 110 identifies whether a phrase is well-formed or not well-formed. A well-formed phrase is one that is grammatically correct, includes correct usage of terms, has proper spelling, and/or otherwise is an acceptable phrase for a particular language. For example, "what is the weather" is a well-formed phrase that conforms to the grammar and usage of the English language, whereas "weather what is" does not conform to proper English.

In some implementations, query processing manager 110 can utilize identified historical usage of a phrase by speakers that have the particular language indicated as a primary language. For example, query processing manager 110 can determine the quantity of occurrences of a phrase in English in searches (or other past interactions) of users with a primary language of English. A user with the particular language as a primary language may be less likely to make grammatical and/or other errors in submitting textual queries, uttering spoken queries in the particular language, and/or otherwise interacting with one or more applications with phrases in the particular language. Thus, whether a phrase occurs in the historical interaction records of user(s) having the particular language as the primary language can indicate that the phrase is (or in the case of absence of the phrase in historical interaction records, is not) well-formed. Query processing manager 110 may determine a quantity of times that the phrase occurs and/or its frequency of occurrence to determine whether the phrase is well-formed. In some implementations, a phrase that occurs infrequently in user historical interaction records may be determined to not be well-formed than a second phrase that occurs with greater frequency in historical interaction records of a speaker of the particular language.

In some implementations, query processing manager 110 may additionally or alternatively utilize one or more documents, such as webpages, that are in the particular language, in determining whether the phrase is well-formed. For example, for a particular language of Spanish, one or more Spanish language websites, such as news outlets in Spanish, can be analyzed to determine a quantity of occurrences of the phrase. Because the sources are in the particular language and, in some cases, have been determined to be trusted sources for language syntax (e.g., known to be grammatically correct), absence of the phrase in the documents can indicate that the phrase is not commonly utilized by speakers of the particular language and thus may not be well-formed.

In some implementations, query processing manager 110 can additionally or alternatively determine a perplexity score for the phrase that may be utilized in determining whether the phrase is well-formed. For example, a natural language processing model, for a particular language of the phrase, may be configured to predict the likelihood that terms of the phrase would co-occur in a phrase and/or occur in the particular sequence in which they are ordered in the phrase. In instances where the natural language processing model is utilized by query processing manager 110 to determine that the first term does not likely follow the second term (i.e., high perplexity) in well-formed phrases, the phrase may be determined to be not well-formed. Conversely, in instances where two or more terms, when taken together in a phrase, have a low perplexity, the phrase may be determined to be well-formed because the phrase likely follows the grammatical rules of the particular language.

In some implementations, query processing manager 110 can additionally or alternatively utilize a machine learning model and/or a rules-based approach to identify grammatical errors and/or incorrect usage of one or more terms in the phrase. For example, for a phrase of "time it is," one or more language models and/or rules may be used to determine that the phrase is not likely a well-formed phrase based on one or more terms being missing and/or in the incorrect order. Thus, a phrase of "time it is" may be identified by query processing manager 110 as not well-formed, whereas the phrase "what time is it," which follows the grammatical rules of English, may be more likely to be categorized as well-formed by query processing manager 110.

In some implementations, query processing manager 110 can additionally or alternatively determine a proficiency level of the source of a phrase in determining the likelihood that a phrase is well-formed. For example, as previously mentioned, one or more documents may be analyzed to identify the occurrence of a phrase. For each of the documents, a score for the level of the proficiency of the author may be utilized in determining whether a phrase is well-formed. As an example, a Spanish language newspaper with a high viewership (i.e., a trusted source) may be more likely to include well-formed phrases than a webpage that is published by an unknown individual. Thus, occurrence of the phrase in one or more webpages of the Spanish language newspaper can be an indication that the phrase is well-formed. Conversely, absence (or low occurrence) of a phrase in one or more documents from a known speaker of the particular language can be indicative of the phrase not being well-formed.

Once query processing manager 110 has determined that a phrase is not well-formed, alternate phrase manager 115 can identify one or more alternate phrases that are well-formed and that are related to the not well-formed phrase. A related phrase can be an alternate phrase that includes the same or similar terms as the not well-formed phrase and/or that causes, when submitted to an automated assistant, the same or a similar response. For example, the not well-formed phrase, "time it is now," when submitted to an automated assistant, can cause the automated assistant to provide the current time. An alternate phrase of "what time is it," when submitted to the automated assistant, may also result in the automated assistant providing a current time.

Alternate phrases can be identified from one or more sources that are similar to the sources that can be utilized to determine whether a phrase is well-formed. For example, query processing manager 110 can identify one or more documents that include well-formed phrases (e.g., an online news source in the particular language of interest) and further identify one or more phrases that have the same intent as the not well-formed phrase.

As an example, for a not well-formed phrase of "weather it is now," alternate phrase manager 115 can utilize one or more natural language processing models to determine an intent of "WEATHER" and a time associated with the phrase of "CURRENT." Also, for example, alternate phrase manager 115 may determine a location, such as "SAN FRANCISCO" based on one or more terms in the phrase, the location of the device that was utilized to submit the phrase being proximate to San Francisco, and/or a default location of San Francisco that has been specified by the user. One or more other documents, that include well-formed phrases, may be identified and candidate phrases that have the same or similar intent (i.e., "WEATHER" for "CURRENT" time at "SAN FRANCISCO").

In some implementations, alternate phrase manager 115 can identify one or more terms that are included in the not well-formed phrase and further identify other well-formed phrases that include the same or similar terms. For example, a not well-formed phrase of "weather is now" includes the term "weather" and other well-formed phrases that also include "weather" can be identified as candidate alternate phrases. Additionally, for example, the not well-formed phrase of "weather is now" includes a time component (i.e., "now") that can be further utilized to identify, from the well-formed phrases that include "weather," the phrases that include "now" or some other term that indicates a current time.

In some implementations, alternate phrase manager 115 can process the not well-formed phrase to generate an encoding of the phrase in vector space. One or more of the alternate phrases may further be encoded into the same vector space and alternate phrases can be selected based on proximity of the encodings of the alternate phrases to the encoding of the phrase. For example, for the not well-formed phrase "Weather now is what," a vector may be generated in a vector space that includes other phrases that are well-formed. Vector representations of one or more of the phrases that are proximate to the vector representing the not well-formed may be selected as candidate well-formed alternates for "Weather now what is," such as "What is the current weather," "What is the weather in San Francisco," "Is it going to be sunny today," and/or other related well-formed phrases.

Once alternate phrase manager 115 has identified candidate alternate phrases, scoring engine 120 can determine a score for each of the phrases that is indicative of similarly in intent of a given well-formed phrase to the not well-formed phrase. For example, for a not well-formed phrase of "weather now is," alternate phrases of "What is the weather now," "What is the current weather," and "The weather is now" may be identified by alternate phrase manager 115 as alternate well-formed phrases based on similarity of intent, similarity of terms, and/or other factors as described herein. Scoring engine 120 may determine a score for each of the phrases that indicates how likely a given phrase would be an acceptable alternate phrase for the not well-formed phrase. For example, scoring engine 120 may determine a score based on proximity of each of the alternate phrases to "weather now is" in a vector space. The resulting scores may be, for example, 0.9 for "What is the weather now" based on similarity of terms to the not well-formed phrase as well as similarity between the intent of the not well-formed phrase and the alternate phrase. Additionally, for example, scoring engine 120 may determine a score of 0.4 for "The weather is now" based on similarity of terms of the alternate phrase and the not well-formed phrase but further based on differences in intent (i.e., the intent of the alternate phrase does not likely have the same intent as the not well-formed phrase).

Scoring engine 120 can select one or more of the alternate phrases as the alternate phrase to provide in lieu of the not well-formed phrase based on the scores associated with the alternate phrases. In some implementations, a single alternate phrase may be selected as the alternate phrase for the not well-formed phrase and an indication of the alternate phrase may be stored in query database 140 with an indication of the not well-formed phrase. In some implementations, multiple alternate phrases may have scores that satisfy a threshold and the multiple phrases may be stored in query database 140. For example, a given not well-formed phrase may have two potential intents and a well-formed alternate phrase for each of the two potential intents may be stored such that one or both may be provided to the user as alternates.

A user may utilize user device 100 to provide a query for further processing. For example, user device 100 may include an automated assistant component that allows a user to submit queries to interact with the automated assistant via a dialog. Also, for example, a user may utilize a graphical user interface 103 (GUI) to type and/or select a phrase to be processed, such as a search query to a search engine. Also, for example, a user may utter a phrase that is captured via microphone 101, which may be processed by automatic speech recognizer 135. Automatic speech recognizer 135 can process the audio to generate a textual representation of the spoken utterance, which then may be further processed by one or more other components, such as an automated assistant. A response to a query may be provided to the user via the GUI 103 and/or via speaker 102 as generated speech by the automated assistant.

In some implementations, the user may submit a query that is not well-formed. The query may first be provided to query processing manager 110, which may determine, based on one or more techniques described herein, whether the phrase is well-formed or not. In the case that the phrase is determined to be not well-formed, query processing manager 110 may determine whether query database 140 includes the not well-formed phrase. If so, query processing manager 110 can select the corresponding alternate phrase(s) and provide the phrase(s) to the graphical user interface manager 130. If the phrase is not included in the query database 140, alternate phrase manager 115 may identify potential alternate phrases, which may then be scored by scoring engine 120, and an alternate phrase may be selected based on the scoring, as described herein.

Figure 2:
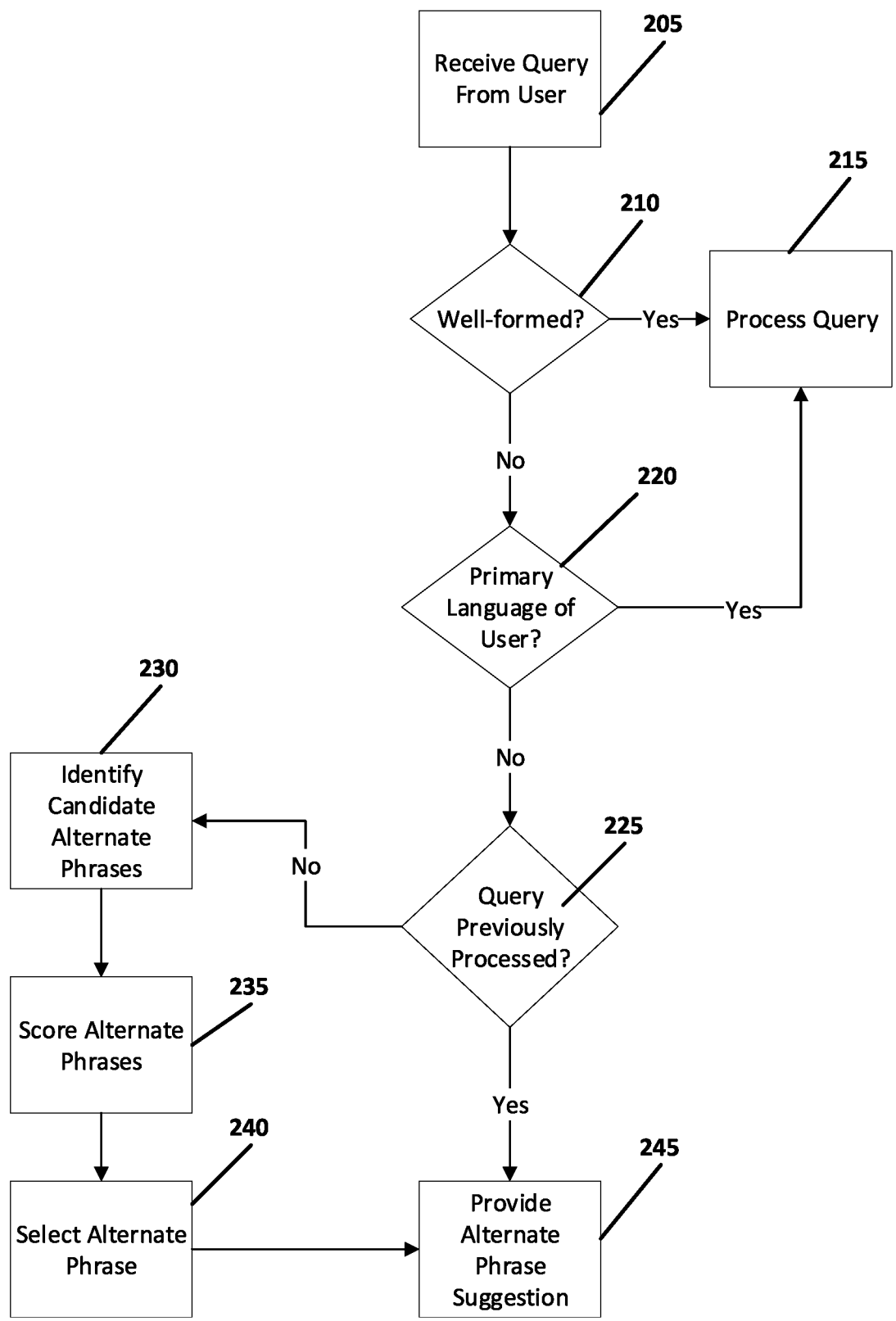
FIG. 2 is a flowchart illustrating one or more implementations described herein.

Referring to FIG. 2, a flowchart is provided that illustrates implementations described herein. At step 205, query processing manager 110 receives a query from a user. The query may be provided by the user as a textual query and/or the query may be provided as a spoken utterance that is captured by microphone 101 and processed into a textual query by automatic speech recognizer 135. For example, a user may submit a query of "weather what is now," which can be received by a component that shares one or more characteristics with query processing manager 110.

At decision block 210, query processing manager 110 can determine whether the phrase that was submitted at step 205 is well-formed, as described herein. In instances where the phrase is well-formed, the process can continue to step 215 and the submitted phrase can be processed based on the type of query. For example, a user may submit a query of "What is the weather now," which is well-formed, and at step 215, an automated assistant can determine the current weather for a location and provide a response to the user via GUI 103 and/or speaker 102.

If the received phrase is not well-formed, the process can continue to decision block 220, and the primary language of the user can be determined. Decision block 220 is, in some instances, an optional step such that the process can continue to decision block 225 from decision block 210. In some implementations, proficiency manager 125 may determine whether the particular language of the submitted phrase is the primary language of the user and/or how proficient the user is with the particular language of the query. For example, a user may have an associated account that indicates the primary language of the user and/or an indication of how proficient the user is with one or more languages. In some implementations, where the particular language of the query is the primary language of the user and/or the user has an indicated proficiency in the particular language that satisfies a threshold, the process can continue to step 215 and the phrase can be further processed as described herein. Thus, an alternate phrase may be suggested to the user only when the user has a lower proficiency in the particular language and not in instances where the user has submitted a phrase that is in a primary language of the user and/or that the user has a threshold proficiency.

In some implementations, proficiency manager 125 may determine a particular proficiency measure that can be indicative of whether the particular language is the primary language of the user and/or whether, based on the proficiency measure, to provide an alternate phrase. For example, the phrase "weather now" is not well-formed, but a user with English as a primary language and/or a user with a proficiency measure that satisfies a threshold may submit the phrase as a shortcut to uttering a well-formed alternative (e.g., "what is the weather now"). In this instance, the user may not be provided an alternate phrase but instead the phrase may be further processed at step 215.

In some implementations, decision block 220 may include the proficiency manager 125 determining a particular language proficiency measure for the user based on past interactions of the user. The interactions can be between the user and one or more applications. In some instances, the language proficiency measure can be determined based on the past interactions with particular applications. For example, interactions of the user with select applications may be utilized to determine a language proficiency measure, while interactions of the user with other applications may not be utilized to determine the language proficiency measure.

In some implementations, decision block 220 may include proficiency manager 125 utilizing one or more queries that are provided by the user via a spoken utterance to determine a language proficiency measure for the user. For example, the choice of vocabulary of the user, when submitting spoken queries in the language, may be indicative of the proficiency of the user. Accordingly, the proficiency manager 125 can determine a language proficiency measure that reflects the limited vocabulary of the user. Also, for example, grammatical and/or pronunciation errors of the user, when submitting spoken queries in the language, may be indicative of the language proficiency of the user. Accordingly, proficiency manager 125 may determine a language proficiency measure for a user that submits queries with grammatical and/or pronunciation errors that is less indicative of proficiency than a user that submits one or more spoken queries that are grammatically correct.

In some implementations, decision block 220 may include proficiency manager 125 determining a particular language proficiency measure based on text submitted by the user. For example, with permissions from the user, proficiency manager 125 can identify text from emails of the user that includes terms and/or phrases in the particular language and, based on the correctness of the grammar and/or the selection of terms in the emails (or other documents), utilize the grammar and/or terms to determine a language proficiency measure for the user. Also, for example, auto-suggestions that are provided to the user when submitting queries can be utilized to determine a language proficiency measure (e.g., common terms that are autocorrected can result in a determined language proficiency measure that is less indicative of proficiency than a user that does not require autocorrect for the same common terms and/or phrases).

In some implementations, a particular language proficiency measure can be determined by the proficiency manager 125 based on the user submitting queries (e.g., spoken queries and/or text queries) that are related to the language but provided in the primary language of the user. For example, a user may submit a request to translate a phrase from the primary language of the user to the language. The language proficiency measure can be determined based on complexity of the phrases such that, for example, a user that submits requests for common terms may have a lower determined proficiency measure than a user that submits requests to translate more complex phrases.

In some implementations, user requests for additional information related to the language can be utilized by proficiency manager 125 to determine a particular language proficiency measure for the user. In some implementations, web activity of the user may be utilized to determine a language proficiency measure for the user. For example, in addition to submitting requests to translate terms into the language and/or submitting queries in the language, the user may submit a request to be provided with additional resources related to learning the language, such as "what is the best way to learn Spanish" or "take me to a website for learning French." Also, for example, the user may navigate to a webpage that is related to learning the language. Also, for example, the user may navigate to webpages that include content that is in the language. In some implementations, interactions of the user with one or more language learning applications can be utilized to determine a language proficiency measure for the user. For example, a user may download an application that is utilized to learn the language, interact with one or more applications that are related to learning the language, and/or otherwise utilize an application that, through the interactions of the user, may be used to determine a language proficiency measure for the user.

At decisions block 225, query processing manager 110 can check in query database 140 to determine whether the phrase has been previously processed. If the phrase has not been previously processed to determine alternate phrases, alternate phrase manager 115 can identify alternate phrases at step 230, as described herein. Scoring engine 120 can further score the identified alternate phrases at step 235 and query processing engine 110 can select one or more of the phrases as an alternate phrase to the submitted phrase at step 240 and as described herein.

At step 245, query processing engine 1120 can provide graphical user interface manager 130 with one or more alternate phrases. Graphical user interface manager 130 can then render a GUI 103 that includes the alternate well-formed phrase(s). Thus, the user can be provided with alternatives that are well-formed and that are related to the phrase that was initially submitted by the user. The user may select one of the provided alternate phrases and/or continue with the not well-formed phrase that was submitted initially.

Figure 3:
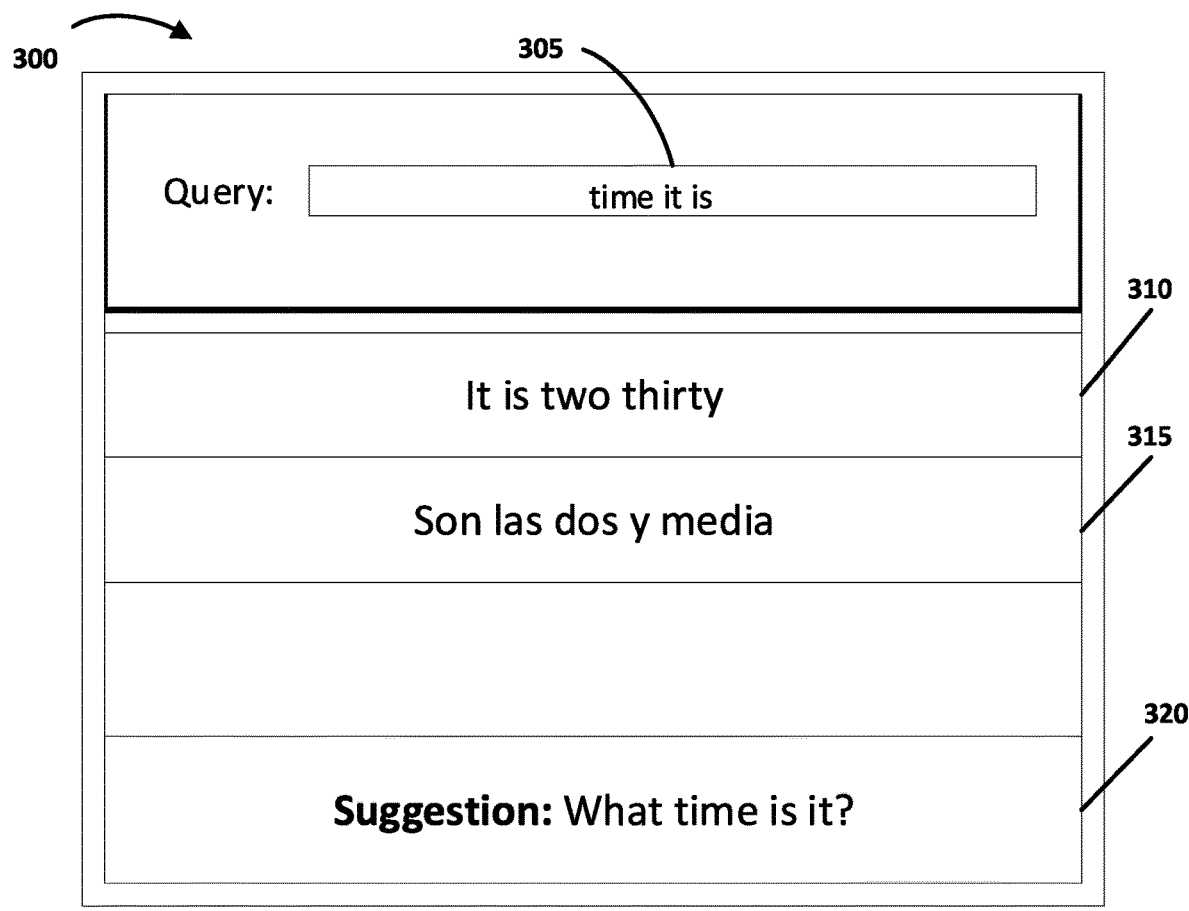
FIG. 3 illustrates an interface that may be provided to a client device of a user.

Referring to FIG. 3, an example interface 300 is provided that can be provided to a user in response to receiving a not well-formed phrase. The not well-formed phrase 305 is illustrated as the received phrase from the user. For this example, it is assumed that the primary language of the user is Spanish and that the particular language of the submitted phrase is English. The primary language of the user may be determined based on a setting of an account associated with the user (e.g., a selected primary language and/or a proficiency score for English that is associated with the user). The not well-formed phrase, "time it is," has an intent of user interest in being provided a current time, but the phrase is not in proper grammatical form. The submitted query 305 may be provided by the user via an interface that allows the user to type in the phrase and/or the submitted query may be identified from captured audio and converted to text by a component that shares one or more characteristics with automatic speech recognizer 135.

A first response 310 of "it is two thirty" is included in the interface 300. The response 310 may be generated by, for example, an automated assistant that can process queries and provide responses based on the intent of the query. For example, the phrase "time it is" has been determined by an automated assistant to be a request for the current time. The response 310, "it is two thirty" has been provided to the user based on the determined intent of the phrase. Further, a second response 315, "son las dos y media," a Spanish (i.e., primary language of the user) response to the provided phrase 305. In some instances, one of the first response 310 and the second response 315 may not be provided. For example, a response may be provided only in the primary language of the user and/or in the language of the received phrase.

Recommended phrase 320 is provided as an alternative to the not well-formed phrase 305. The recommended phrase 320, "what time is it," has been determined to be well-formed and to have the same (or similar) intent as the not well-formed phrase 305, as described herein. For example, the recommended phrase 320 of "what time is it" has the same intent as "time it is," the provided not-well-formed phrase.

In some implementations, the well-formed recommended phrase 320 may be selectable to allow the user to submit the recommended phrase in lieu of submitting the not well-formed phrase 305. For example, the interface 300 may include an indication that the submitted phrase is not well-formed and that one or more suggested alternates may have the same intent and be well-formed. The user may then have the option to select an alternate phrase, for example, submit to an automated assistant for further processing. By allowing the user to submit a phrase that is well-formed, efficiency of the system is improved because it is more likely that the well-formed phrase will result in an intended response, whereas submission of the not well-formed phrase may result in an unintended response and/or require multiple submissions by the user, resulting in inefficiency use of computing resources before an intended response is provided.

Figure 4:
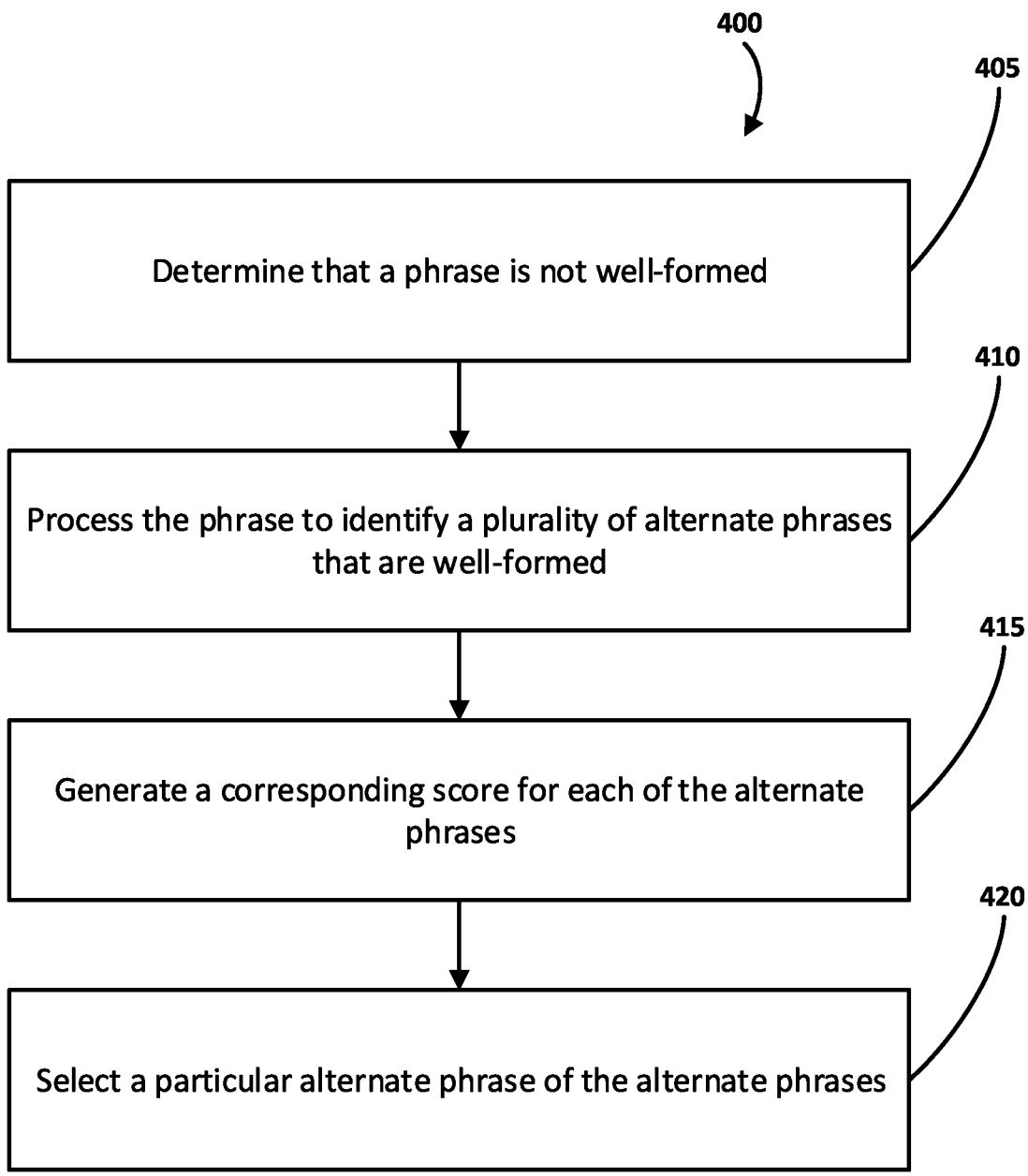
FIG. 4 is a flowchart of one or more implementations described herein.

Referring to FIG. 4, a flowchart 400 is provided that illustrates implementations described herein. In some implementations, one or more steps may be absent, one or more additional steps may be performed, and/or the illustrated steps may be performed in a different order.

At step 405, a phrase is determined to be not well-formed. The determination may be performed by a component that shares one or more characteristics with query processing manager 110. For example, query processing manager 110 can determine that a phrase is not well-formed based on a number of occurrences of the phrase in one or more documents, such as webpages that have been determined to be from sources that are proficient in the language of the phrase. Also, for example, query processing manager 110 can utilize one or more machine learning models and/or rules to determine whether the grammar and/or vocabulary of the phrase is correct such that the phrase can be determined to be well-formed. Also, for example, query processing manager 110 can identify occurrences of the phrase that have been submitted by other users, such as queries that users with a primary language of the particular language of the phrase have previously submitted.

At step 410, the phrase is processed to identify a plurality of alternate phrases that are well-formed. The phrase can be processed by a component that shares one or more characteristics with alternate phrase manager 115. For example, alternate phrase manager 115 can determine an intent for the phrase and further identify other phrases that have the same or similar intent, as described herein. Phrases can be identified by, for example, embedding the phrase in a vector space and identifying other embedded phrases that are in proximity to the vector, from other documents, and/or from submissions of other users.

At step 415, a corresponding score is determined for each of the identified alternate phrases. The corresponding score may be indicative of likelihood that the corresponding alternate phrase is a suitable replacement for the submitted not well-formed phrase. The score for each of the alternate phrases can be determined by a component that shares one or more characteristics with scoring engine 120. For example, scoring engine 120 may determine a score based on a source of the alternate phrase, similarity between terms of the alternate phrase and the not well-formed phrase, distance between vectors representing the alternate phrase and the not well-formed phrase, and/or other techniques described herein.

At step 420, a particular alternate phrase of the alternate phrases is selected to provide as a suggestion in lieu of the not well-formed phrase. The phrase can be selected by a component that shares one or more characteristics with query processing manager 110. In some implementations, the alternate phrase can be selected based on the score associated with the alternate phrase. For example, an alternate phrase of the alternate phrases (or a plurality of alternate phrases) that satisfies a threshold may be selected as alternate phrases that are well-formed and have the same (or similar) intent to the not well-formed phrase. In some implementations, the alternate phrase can be stored in a database that shares one or more characteristics with query database 140 for later usage when a user submits the not well-formed phrase. In some implementations, the alternate phrase may be provided to a component that can render an interface that includes the well-formed phrase, as described herein and illustrated in FIG. 3.

Figure 5:
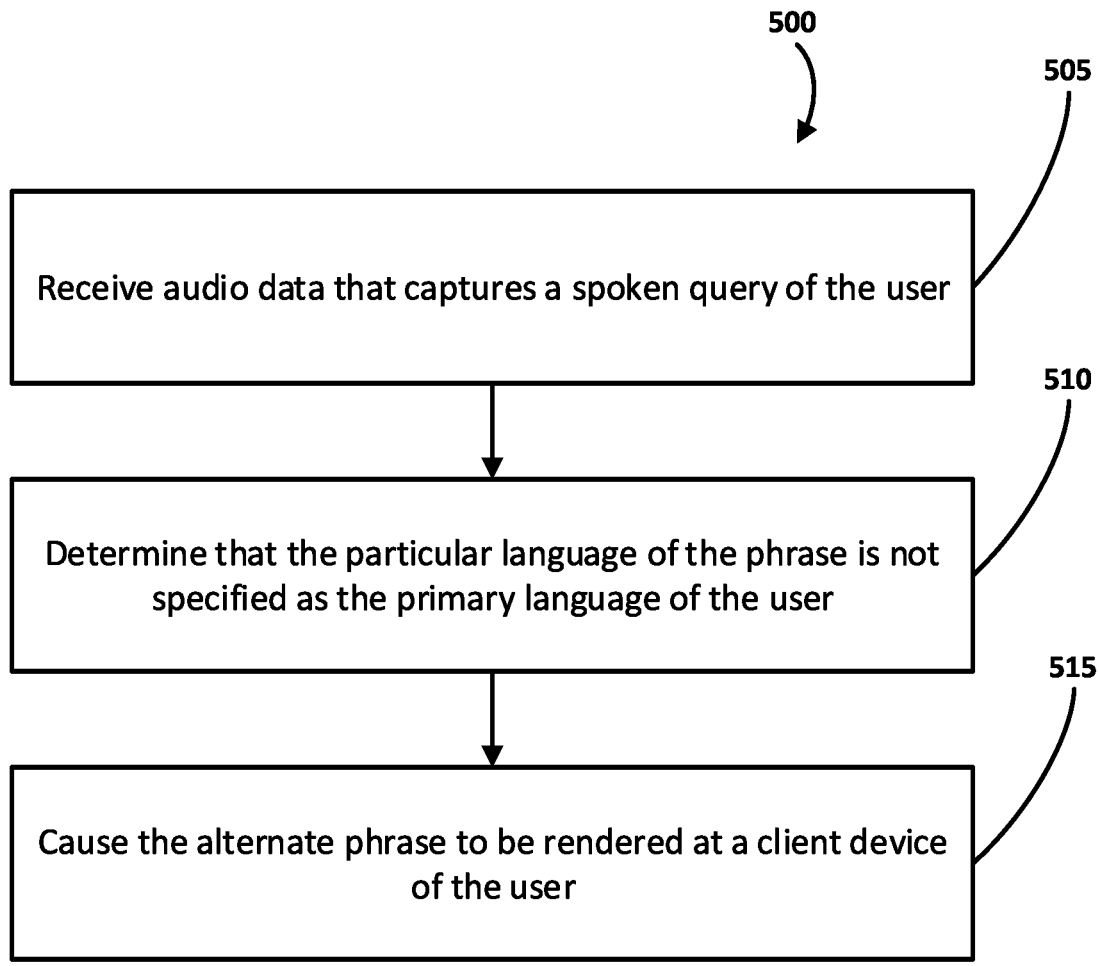
FIG. 5 is a flowchart of one or more additional implementations described herein.

Referring to FIG. 5, a flowchart 500 is provided that illustrates implementations described herein. In some implementations, one or more steps may be absent, one or more additional steps may be performed, and/or the illustrated steps may be performed in a different order.

At step 505, audio data that captures a spoken query of the user is received. The audio data can be captured by a component of a client device, such as microphone 101 of user device 100. The audio data can be converted into text by a component that shares one or more characteristics with automatic speech recognizer 135. For example, automatic speech recognizer 135 can convert audio data to text and provide the textual representation to query processing manager 110 to determine whether the phrase is well-formed. In instances where the phrase is not well-formed, query processing manager 110 can determine whether the phrase (and one or more corresponding alternate phrases) are stored in query database 140. If not, query processing manager 110 can process the query as described with regards to FIG. 4.

At step 510, the particular language of the phrase is determined to be a language other than the primary language of the user. Determining that the language is not the primary language of the user may be performed by a component that shares one or more characteristics with proficiency manager 125. For example, proficiency manager 125 may determine, based on one or more settings of an account associated with the user, that the user has specified a language as a primary language that is different from the language of the not well-formed phrase. Also, for example, proficiency manager 125 can determine that a proficiency measure for the user, that is specific to the language of the not well-formed phrase, does not satisfy a threshold. A proficiency measure can be determined based on one or more techniques described herein, such as based on past interactions of the user.

At step 515, the alternate phrase (or phrases) for the not well-formed phrase is/are rendered via an interface at a client device of the user. The interface may share one or more characteristics with the interface 300 of FIG. 3. Further, the interface can be provided by a component that shares one or more characteristics with graphical user interface manager 130 of FIG. 1.

Figure 6:
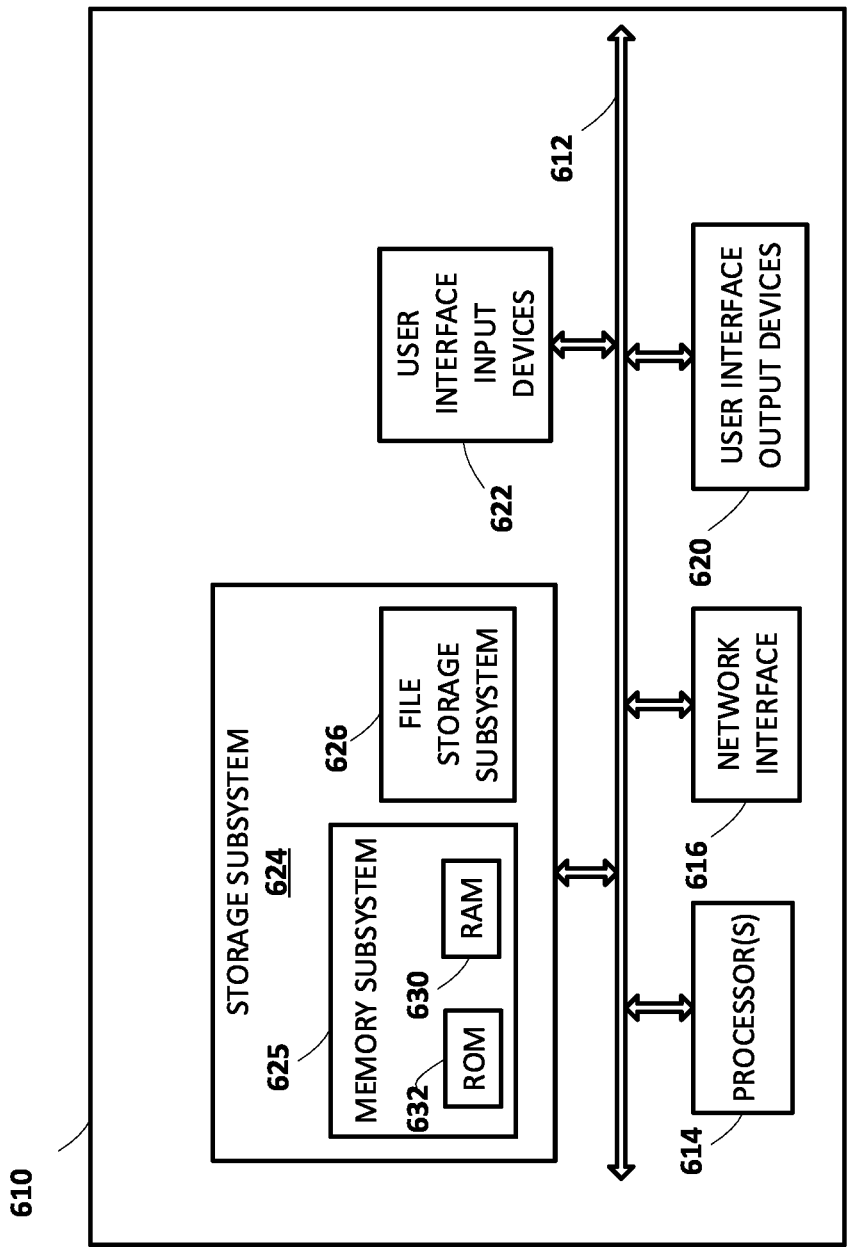
FIG. 6 illustrates an example architecture of a computing device.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 300, method 400, and/or to implement one or more of user device 100, interaction service 102, an operating system executing interaction servic3e 102 and/or one or more of its components, interactor 135, and/or any other engine, module, chip, processor, application, etc., discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In some implementations, a method implemented by one or more processors is provided and includes determining that a phrase that is in a particular language is not well formed. In response to determining that the phrase is not well formed, the method includes processing the phrase to identify a plurality of alternate phrases that are each in the particular language, that are each indicated as well-formed, and that each have a defined relationship to the phrase; generating a corresponding score for each of the alternate phrases; selecting, based on the corresponding scores, a particular alternate phrase of the alternate phrases, and receiving audio data that captures a spoken query, of a user, that includes the phrase, wherein the spoken query is provided via an automated assistant interface of a client device. The method further includes determining that the particular language, of the phrase, is not specified as a primary language for the user; in response to determining that the audio data includes the phrase, and in response to selecting the particular alternate phrase, and in response to determining that the particular language, of the phrase, is not specified as the primary language for the use, the method further includes causing the alternate phrase to be rendered at the client device as a suggestion for utilization in lieu of the phrase.

These and other implementations of the technology disclosed herein can include one or more of the following features.

In some implementations, selecting the particular alternate phrase of the alternate phrases is performed subsequent to receiving the audio data and in response receiving the audio data.

In some implementations, selecting the particular alternate phrase of the alternate phrases is performed prior to receiving the audio data.

In some implementations, determining that the phrase is not well-formed includes identifying a number of occurrences of the phrase in historical records of other users that indicate the particular language as a primary language, and determining that the phrase is not well-formed based on the number of occurrences.

In some implementations, determining that the phrase is not well-formed includes identifying a number of occurrences of the phrase in one or more trusted documents in the particular language, and determining that the phrase is not well-formed based on the number of occurrences.

In some implementations, determining that the phrase is not well-formed includes generating, based on processing the phrase using a language model for the particular language, a perplexity measure for the phrase, and determining that the phrase is not well-formed based on the perplexity measure satisfying a threshold.

In some implementations, determining that the phrase is not well-formed includes determining that the phrase includes one or more syntactical errors, and determining that the phrase is not well-formed based on the one or more syntactical errors.

In some implementations, determining that the phrase is not well-formed includes identifying a source for the phrase, determining a particular language proficiency measure for the source, and determining that the phrase is not well-formed based on the particular language proficiency measure.

In some implementations, processing the phrase to identify a plurality of alternate phrases includes processing the phrase, using a natural language processor, to determine an intent of the phrase, and identifying the alternate phrases based on the alternate phrases being indexed as having a similar intent to the intent.

In some implementations, processing the phrase to identify a plurality of alternate phrases includes processing the phrase, using an encoder model, to generate an encoding of the phrase, and identifying the alternate phrases based on corresponding encodings, of the alternate phrases, each satisfying a distance threshold relative to the encoding of the phrase.

In some implementations, generating the corresponding score for each of the alternate phrases includes comparing the phrase to each of the alternate phrases, and generating the corresponding score for each of the alternate phrases based on the comparing.

In some implementations, generating the corresponding score for a given alternate phrase of the alternate phrases includes determining a source for the given alternate phrase, determining a particular language proficiency measure for the source; and generating the corresponding score for each of the given alternate phrases based on the particular language proficiency measure.

In some implementations, generating the corresponding score for a given alternate phrase of the alternate phrases includes identifying a plurality of usages of the given alternate phrase in one or more documents, and generating the corresponding score for the given alternate phrase based on a quantity of the usages of the given alternate phrase. In some of those implementations, identifying the plurality of usages of the given alternate phrase includes identifying the one or more documents based on the source of the one or more documents indicating the particular language as the primary language of the one or more documents.

In some implementations, a method implemented by one or more processors is provided and includes determining a language proficiency measure that is specific to a user and that is specific to a particular language that is not specified as a primary language for an account of the user, receiving audio data that captures a spoken query, of the user, that includes a phrase in the particular language of the user, wherein the spoken query is provided via an automated assistant interface of a client device; determining that the phrase is not well formed; and determining that the language proficiency measure of the user does not satisfy a threshold proficiency of the user in the particular language. In response to determining that the language proficiency measure does not satisfy the threshold, the method further includes processing the phrase to identify a plurality of alternate phrases that are each in the particular language, that are each indicated as well-formed, that each have a defined relationship to the phrase selecting, based on the corresponding scores, a particular alternate phrase of the alternate phrases, and causing the alternate phrase to be rendered at the client device as a suggestion for utilization in lieu of the phrase. In some of those implementations, determining the language proficiency measure includes determining, based on processing particular language interaction data of a user, the language proficiency measure, wherein the particular language interaction data of the user is based on past interactions of the user, via one or more client devices associated with the account of the user, that are related to the particular language.

Some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations additionally or alternatively include one or more non-transitory computer readable storage media storing computer instructions executable by one or more processors to perform any of the methods described herein.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before the data is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, the method comprising:

prior to receiving audio data that captures a spoken query, of a user, that includes a particular phrase in a particular language:

determining that the particular phrase that is in the particular language is not well formed;

in response to determining that the particular phrase in the particular language is not well formed:

processing the particular phrase in the particular language to identify a plurality of alternate phrases that are each in the particular language, that are each indicated as well-formed, and that each have a defined relationship to the particular phrase, wherein processing the particular phrase in the particular language to identify the plurality of alternate phrases that are each in the particular language, that are each indicated as well-formed, and that each have a defined relationship to the particular phrase, comprises:

processing, using a machine learning model, the particular phrase to generate a corresponding embedding for particular phrase;

comparing, in embedding space, the corresponding embedding for the particular phrase to a plurality of previously generated embeddings, the plurality of previously generated embeddings including corresponding embedding for at least each of the plurality of alternate phrases; and identifying, based on the comparing in the embedding space, the plurality of alternate phrases that are each in the particular language, that are each indicated as well-formed, and that each have a defined relationship to the particular phrase;

generating a corresponding score for each of the alternate phrases; and selecting, based on the corresponding scores for each of the alternate phrases, a particular alternate phrase, of the alternate phrases, that is in the particular language and that is well formed;

subsequent to selecting the particular alternate phrase:

receiving the audio data that captures the spoken query, of the user, that includes the particular phrase, wherein the spoken query is provided by the user via an automated assistant interface of a client device of the user;

determining that the particular language, of the particular phrase, is not a primary language for the user; and in response to determining that the audio data includes the particular phrase and in response to determining that the particular language, of the particular phrase, is not the primary language for the user:

refraining from causing a particular language response, in the particular language, to be visually rendered at the client device;

causing the particular alternate phrase to be visually rendered, in the particular language, at the client device as a suggestion to be utilized in lieu of the particular phrase; and in response to receiving a user selection of the particular alternate phrase:

causing the particular language response, that is responsive to the particular alternate phrase in the particular language, to be visually rendered at the client device; and causing a primary language response, that is responsive to the particular alternate phrase in the primary language, to be visually rendered at the client device and along with the particular language response.

2. The method of claim 1, wherein determining that the particular phrase is not well-formed comprises:

identifying a number of occurrences of the particular phrase in historical records of other users that indicate the particular language as the primary language; and determining that the particular phrase is not well-formed based on the number of occurrences.

3. The method of claim 1, wherein determining that the particular phrase is not well-formed comprises:

identifying a number of occurrences of the particular phrase in one or more trusted documents in the particular language; and determining that the particular phrase is not well-formed based on the number of occurrences.

4. The method of claim 1, wherein determining that the particular phrase is not well-formed comprises:

generating, based on processing the particular phrase using a language model for the particular language, a perplexity measure for the particular phrase; and determining that the particular phrase is not well-formed based on the perplexity measure satisfying a threshold.

5. The method of claim 1, wherein determining that the particular phrase is not well-formed comprises:

determining that the particular phrase includes one or more syntactical errors; and determining that the particular phrase is not well-formed based on the one or more syntactical errors.

6. The method of claim 1, wherein determining that the particular phrase is not well-formed comprises:

identifying a source for the particular phrase;

determining a particular language proficiency measure for the source; and determining that the particular phrase is not well-formed based on the particular language proficiency measure.

7. The method of claim 1, wherein generating the corresponding score for each of the alternate phrases comprises:

comparing the particular phrase to each of the alternate phrases; and generating the corresponding score for each of the alternate phrases based on the comparing.

8. The method of claim 1, wherein generating the corresponding score for a given alternate phrase, of the alternate phrases, comprises:

determining a source for the given alternate phrase;

determining a particular language proficiency measure for the source; and generating the corresponding score for each of the given alternate phrases based on the particular language proficiency measure.

9. The method of claim 1, wherein generating the corresponding score for a given alternate phrase, of the alternate phrases, comprises:

identifying a plurality of usages of the given alternate phrase in one or more documents; and generating the corresponding score for the given alternate phrase based on a quantity of the usages of the given alternate phrase.

10. The method of claim 9, wherein identifying the plurality of usages of the given alternate phrase comprises:

identifying the one or more documents based on the source of the one or more documents indicating the particular language as the primary language of the one or more documents.

11. A method implemented by one or more processors, the method comprising:
  receiving audio data that captures a spoken query, of a user, that includes a phrase in a non-primary language, wherein the spoken query is provided via an automated assistant interface of a client device; and
  in response to receiving the audio data that captures the spoken query:
    determining, a language proficiency measure that is specific to the user and that is specific to the non-primary language;
    determining that the phrase is not well formed;
    determining that the language proficiency measure of the user does not satisfy a threshold proficiency of the user in the non-primary language that is not the primary language of the user; and
    in response to determining that the language proficiency measure does not satisfy the threshold:
      processing the phrase to identify a plurality of alternate phrases that are each in the non-primary language, that are each indicated as well-formed, and that each have a defined relationship to the phrase, wherein processing the phrase to identify the plurality of alternate phrases that are each in the non-primary language, that are each indicated as well-formed, and that each have a defined relationship to the phrase, comprises:
        processing, using a machine learning model, the phrase to generate a corresponding embedding for phrase;
        comparing, in embedding space, the corresponding embedding for the phrase to a plurality of previously generated embeddings, the plurality of previously generated embeddings including corresponding embedding for at least each of the plurality of alternate phrases; and
        identifying, based on the comparing in the embedding space, the plurality of alternate phrases that are each in the non-primary language, that are each indicated as well-formed, and that each have a defined relationship to the phrase;
      selecting a particular alternate phrase of the alternate phrases; and
      subsequent to selecting the particular alternate phrase:
        refraining from causing a non-primary language response, in the non-primary language, to be visually rendered at the client device;
        causing the particular alternate phrase to be visually rendered, in the non-primary language, at the client device as a suggestion to be utilized in lieu of the phrase; and
        in response to receiving a user selection of the particular alternate phrase:
          causing the non-primary language response, that is responsive to the particular alternate phrase in the non-primary language, to be visually rendered at the client device.

12. The method of claim 11, wherein determining the language proficiency measure comprises:
  determining, based on processing non-primary language interaction data of the user, the language proficiency measure, wherein the non-primary language interaction data of the user is based on past interactions of the user, via one or more client devices associated with an account of the user, that are related to the non-primary language.

13. The method of claim 11, in response to receiving a user selection of the particular alternate phrase, further comprising:
  causing a primary language response, that is responsive to the particular alternate phrase in the primary language, to be rendered at the client device and along with the non-primary language response.

14. A system comprising:
  at least one processor; and
  memory storing instructions that, when executed, cause the at least one processor to be operable to:
    prior to receiving audio data that captures a spoken query, of a user, that includes a particular phrase in a particular language:
      determine that the particular phrase that is in the particular language is not well formed;
      in response to determining that the particular phrase in the particular language is not well formed:
        process the particular phrase in the particular language to identify a plurality of alternate phrases that are each in the particular language, that are each indicated as well-formed, and that each have a defined relationship to the particular phrase, wherein, in processing the particular phrase in the particular language to identify the plurality of alternate phrases that are each in the particular language, that are each indicated as well-formed, and that each have a defined relationship to the particular phrase, the at least one processor is operable to:
          process the particular phrase, using an encoder model, to generate an encoding of the particular phrase; and
          identify the plurality of alternate phrases based on corresponding encodings, for each of the plurality of alternate phrases, satisfying a distance threshold relative to the encoding of the particular phrase;
        generate a corresponding score for each of the alternate phrases; and
        select, based on the corresponding scores for each of the alternate phrases, a particular alternate phrase, of the alternate phrases, that is in the particular language and that is well formed;
      subsequent to selecting the particular alternate phrase:
        receive the audio data that captures the spoken query, of the user, that includes the particular phrase, wherein the spoken query is provided by the user via an automated assistant interface of a client device of the user;
        determine that the particular language, of the particular phrase, is not a primary language for the user; and
        in response to determining that the audio data includes the particular phrase and in response to determining that the particular language, of the particular phrase, is not the primary language for the user:
          refrain from causing a particular language response, in the particular language, to be visually rendered at the client device;
          cause the particular alternate phrase to be visually rendered, in the particular language, at the client device as a suggestion to be utilized in lieu of the particular phrase; and in response to receiving a user selection of the particular alternate phrase:

cause the particular language response, that is responsive to the particular alternate phrase in the particular language, to be visually rendered at the client device; and cause a primary language response, that is responsive to the particular alternate phrase in the primary language, to be visually rendered at the client device and along with the particular language response.

\* \* \* \* \*